United States Patent [19]

Krawiec

[11] 3,715,275
[45] Feb. 6, 1973

[54] BIMETALLIC SPACER GRID ARRANGEMENT

[75] Inventor: Donald M. Krawiec, Thompsonville, Conn.

[73] Assignee: Combustion Engineering, Inc., Windsor, Conn.

[22] Filed: March 2, 1970

[21] Appl. No.: 15,510

[52] U.S. Cl. .................................176/78, 176/76
[51] Int. Cl. ...............................................G21c 3/34
[58] Field of Search.................................176/76, 78

[56] References Cited

UNITED STATES PATENTS

| | | | |
|---|---|---|---|
| 3,398,053 | 8/1968 | Huber et al............................. | 176/78 |
| 3,380,890 | 4/1968 | Glandin et al.......................... | 176/78 |
| 3,442,763 | 5/1969 | Chetter et al.......................... | 176/78 |
| 3,379,617 | 4/1968 | Andrews et al........................ | 176/78 |
| 3,350,275 | 10/1967 | Venier et al........................... | 176/78 |
| 3,423,287 | 1/1969 | Anthony et al....................... | 176/76 X |

Primary Examiner—Carl D. Quarforth
Assistant Examiner—Gary G. Solyst
Attorney—Carlton F. Bryant, Eldon H. Luther, Robert L. Olson, John F. Carney, Richard H. Berneike, Edward L. Kochey, Jr. and Lawrence P. Kessler

[57] ABSTRACT

A bimetallic spacer grid arrangement for fuel element support in nuclear reactors. A matrix of spacer elements formed from a first material having characteristic low neutron capture cross section has nested therewithin a matrix of spring elements formed of a second material having better stress relaxation properties than said first material. The spring elements consist of an interconnected series of strips of the second material having integral tab-like projections protruding laterally therefrom at selected points so as to serve as fuel element biasing members.

3 Claims, 6 Drawing Figures

INVENTOR
DONALD M. KRAWIEC

INVENTOR.
DONALD M. KRAWIEC 3,715,275

BIMETALLIC SPACER GRID ARRANGEMENT

BACKGROUND OF THE INVENTION

Proper and efficient supporting of fuel elements within nuclear reactors is a subject upon which there has been much study and experimentation. The problem is complicated by the varied considerations which must be taken into account when designing the fuel element support structure. The supporting structure arrangement must permit relatively efficient flow distribution of the reactor coolant over the fuel elements in order to prevent overheating and possible rupture of the fuel element claddings. Moreover, the material from which the supporting structure is fabricated must be of a characteristic low neutron capture cross section in order not to adversely effect overall reactor efficiency; at the same time the material must be of such a strength so as to provide sufficient support of the fuel elements to prevent damaging vibrations from developing therein. Additionally, the spacer grid arrangement must be capable of permitting easy loading of the fuel elements without the possibility of their jamming or binding.

SUMMARY OF THE INVENTION

In order to accomplish the aforementioned desired characteristics there is herein provided a bimetallic spacer grid arrangement comprised of a matrix of spacer elements formed from a first material having characteristic low neutron capture cross section having internested therewith a matrix of spring elements formed of a second material having better stress relaxation properties than the first material. The spring elements consist of a series of interconnected strips of the second material having integral tablike projections protruding therefrom at selected points so as to serve as fuel element biasing members. The biasing members will resiliently urge the fuel elements interposed through the spacer grid arrangement against arches formed on the spacer elements to support the fuel elements so as to protect against vibrational damage thereof while not adversely effecting reactor coolant flow.

DESCRIPTION OF THE PREFERRED EMBODIMENT

Figure 1:
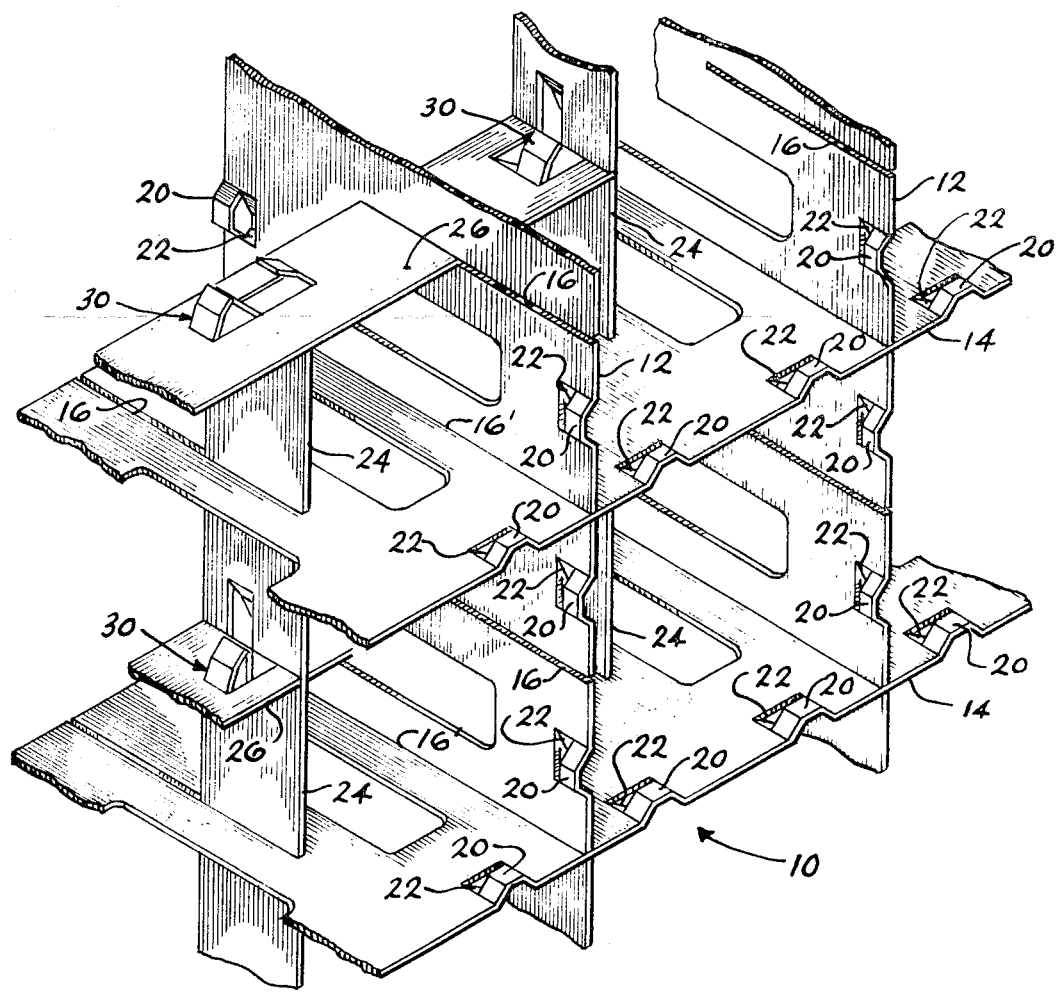
FIG. 1 is a perspective view of a typical portion of the bimetallic spacer grid arrangement according to the present invention rotated 90° about the vertical axis for ease of showing.
Figure 2:
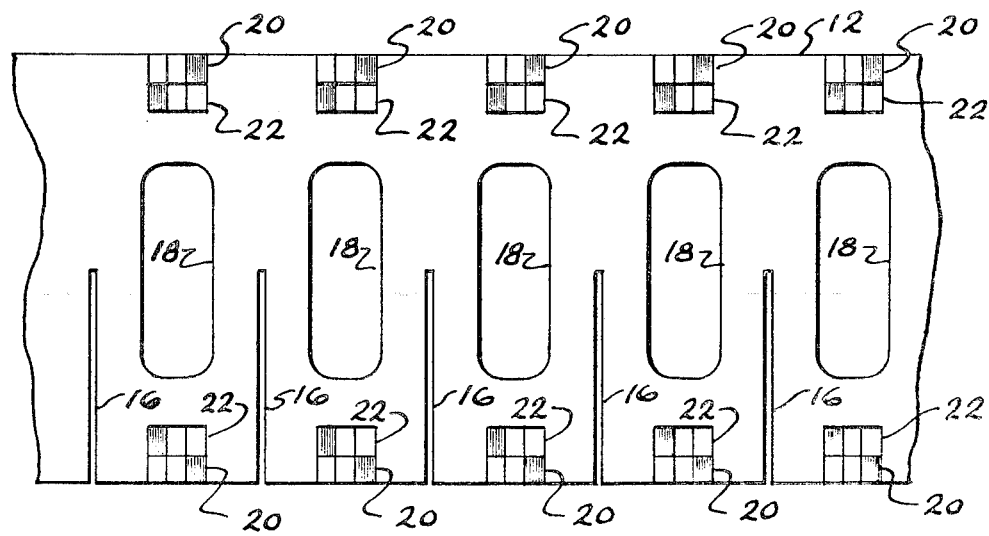
FIG. 2 is a side elevational view of a segment of a spacer element of FIG. 1.

Referring now to the drawings, FIG. 1 shows a typical portion of a bimetallic spacer grid arrangement according to the present invention rotated 90° about the vertical axis for ease of showing. The spacer grid arrangement 10 is comprised of a first series of parallel spacer elements 12 transversely internested with a second series of parallel spacer elements 14 so as to form a matrix of spacer elements, the elements of which may be joined as by welding at the intersections thereof. The spacer elements 12 and 14 are formed of a first material having a characteristic low neutron capture cross section such as Zircaloy. FIG. 2 shows the details of a typical spacer element 12 (spacer elements 14 are identical in structure). The spacer element 12 has longitudinal slots 16 and cut-out openings 18. The slots 16 are engageable with similar slots in spacer elements 14 so that these spacer elements when nested in the matrix configuration form parting lines 16' (FIG. 1). The cut-out openings 18 are for the purpose of reducing the amount of material used in the grid arrangement and to permit reactor coolant flow therethrough. The spacer element 12 additionally has arches 20 and 22 formed thereon which provide fixed points of support for the fuel elements passing through the spacer grid arrangement 10.

Figure 3:
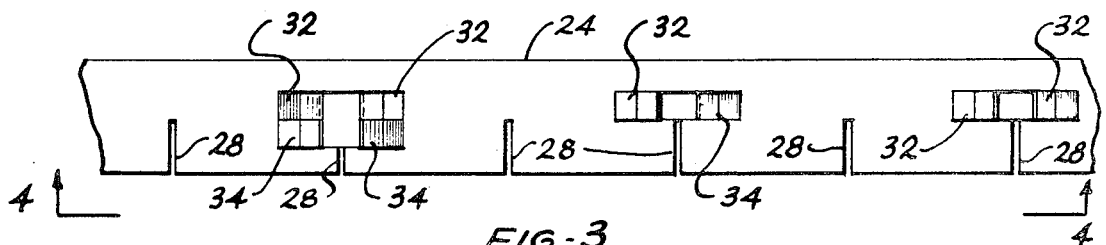
FIG. 3 is a side elevational view of a segment of a spring element of FIG. 1.
Figure 4:
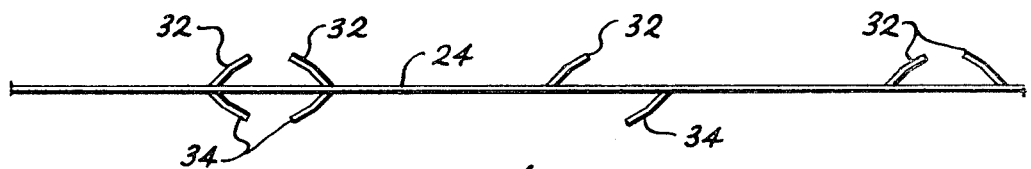
FIG. 4 is a plan view of the spring element looking in the direction of lines 4—4 of FIG. 3.
Figure 5:
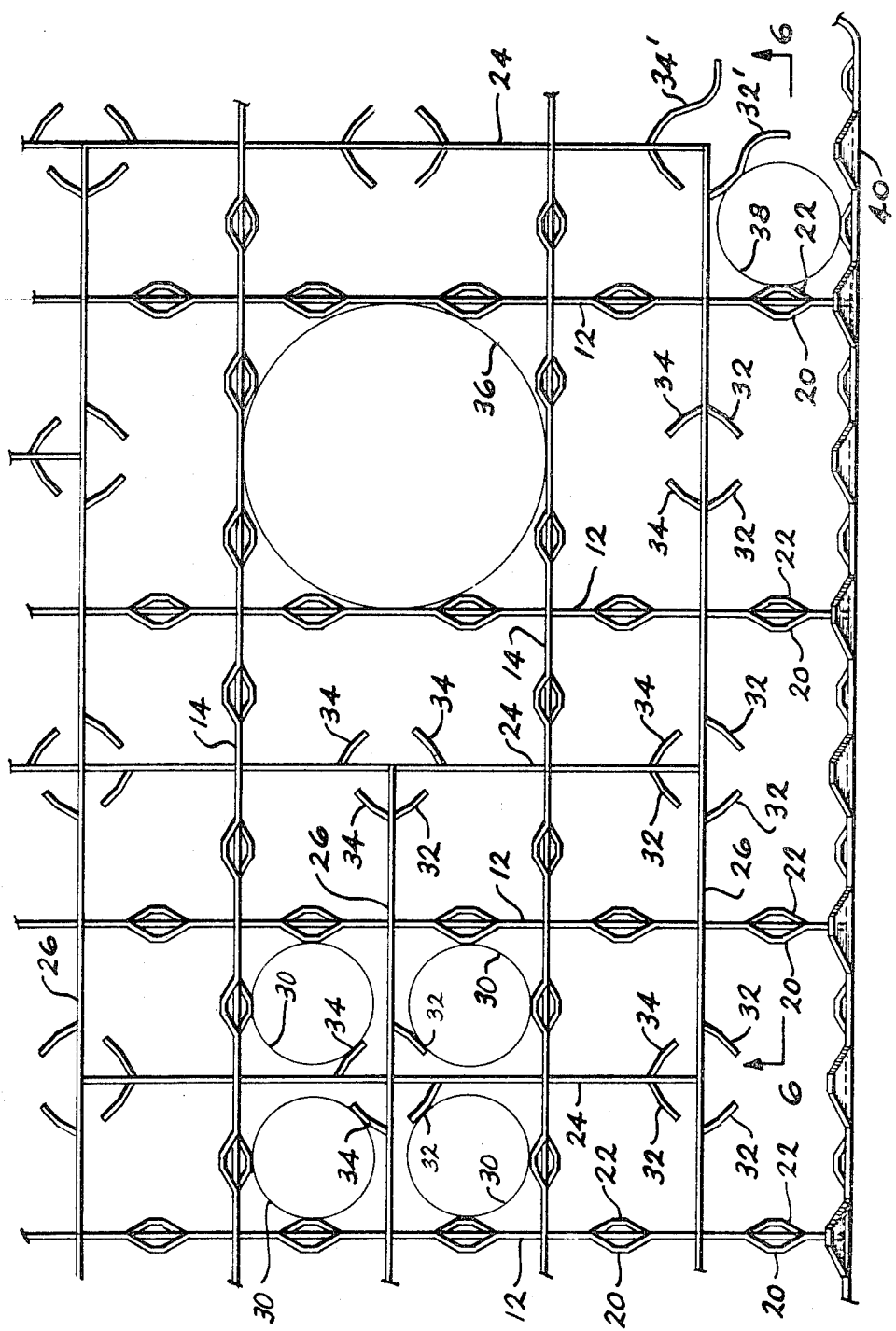
FIG. 5 is a plan view of the typical portion of the spacer grid arrangement of FIG. 1.

Interspaced in the spacer element matrix is a first series of spring element strips 24 spaced parallel to the first series of spacer elements 12 and a second series of spring element strips 26 transversely interconnected (such as by internesting and welding) with the first series of spring element strips 24 and spaced parallel to the second series of spacer elements 14. Spring element strips 24 and 26 are formed of a second material having better stress relaxation properties than the material from which spacer elements 12 and 14 are formed. For example, this material may be Inconel. FIGS. 3 and 4 show typical construction of a spring element strip 24 (spring element strips 26 are identical in construction). The spring element strip 24 has a series of slots 28 alternately engageable with slots 16 in spacer elements 12 (or 14) and corresponding slots in transversely intersecting spring element strips 26. Integral tab-like spring projections 32, 34 are selectively stamped out of the material of the strips 24 (and 26) so as to be located adjacent the intersections of the strips and opposite parting line 16'. Each of the tab-like projections have a biasing or contact surface which is directed toward the opposite parting line 16' so as to bias or force fuel elements 30 passing through the spacer grid arrangement 10 against arches 20 and 22 of spacer elements 12 and 14 which form the parting line 16 (see FIG. 5). The tab-like projections 32, 34 are shown in FIGS. 3 and 4 in three typical configurations, the configurations being dependent upon location within the grid arrangement 10; i.e. four tabs at one location, two oppositely facing tabs at one location, and two tabs facing in the same direction at one location.

Figure 6:
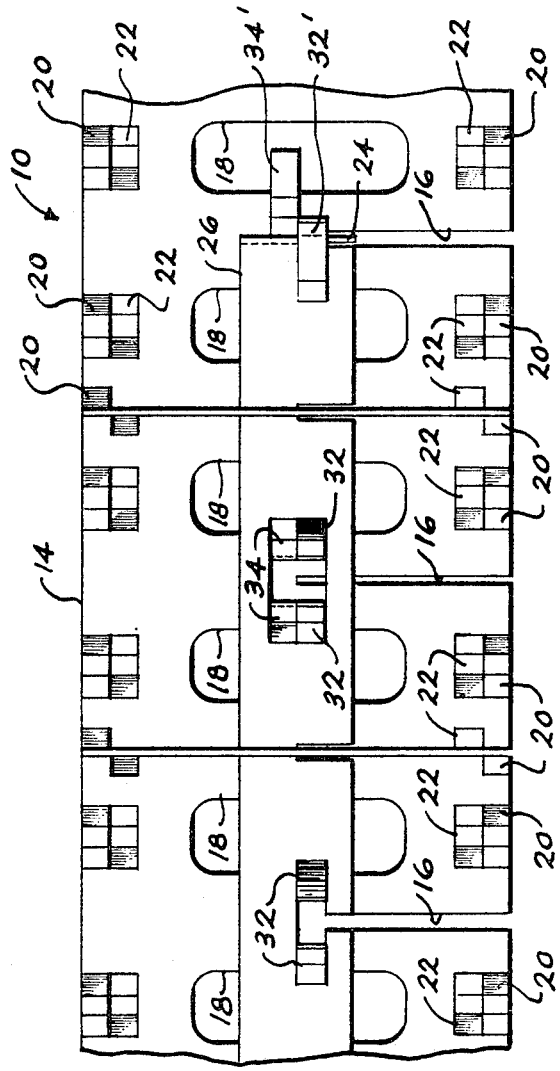
FIG. 6 is a sectional side elevation of the spacer grid arrangement taken on line 6—6 of FIG. 5.

Referring again to FIGS. 1, 5 and 6, the assembly of the spacer grid arrangement 10 provides for a matrix of interconnected spacer elements 12 and 14 within which is nested a matrix of interconnected spring element strips 24 and 26. The internesting is necessary to confine the spring element matrix within the spacer element matrix since the different material from which each matrix is made may be incompatible for joining by welding techniques. This arrangement provides for the biasing of fuel elements 30 against arches 20 and 22 of the spacer elements 12 and 14 by the tab-like spring projections 32 and 34 of spring strips 24 and 26 so that a fiverpoint support of the fuel elements is accomplished with a minimum of additional elements within the reactor and without adversely effecting reactor coolant flow.

The configuration of the spring projections 32, 34 is dependent upon the particular location within the overall grid arrangement; i.e. whether the spring projection is adjacent a fuel element 30, opposite the arrangement perimeter strip 40, or on the end of a spring element strip 24, 26. The entire arrangement is surrounded by a perimeter strip 40 of a like material as the spacer elements 12 and 14 connected thereto such as by welding; there are special tab-like spring projections 32' and 34' for biasing fuel elements in the corners against the perimeter strip 40. The spring element matrix has segments of the spring element strips removed to provide for passage of reactor control element assembly units 36 through spacer grid arrangement 10.

In this manner there is herein provided a novel bimetallic spacer grid arrangement employing internested matrices of spacer elements and spring element strips. The spacer elements are formed of a first material such as Zircaloy having characteristic low neutron capture cross section while the spring element strips are formed of a second material such as Inconel having better stress relaxation properties than the first material. By having integral tab-like spring projections protruding from the spring element strips to provide biasing of the fuel elements against the spacer element arches, there is accomplished a reduction in the number of pieces of material within the spacer grid arrangement (thereby reducing the possibility of damage due to loose spacer grid pieces in the reactor system) without effecting the efficiency of the spacer grid arrangement or adversely effecting reactor coolant flow.

While this preferred embodiment of the invention has been shown and described, it will be understood that it is merely illustrative and that changes may be made without departing from the scope of the invention as claimed.

I claim:

1. A bimetallic spacer grid arrangement for fuel assembly support within a nuclear reactor comprising an interconnected matrix of spacer elements formed of a first material having a characteristic low neutron capture cross section, said interconnected matrix of spacer elements including a first series of spacer elements aligned in spaced parallel rows, a second series of spacer elements aligned in spaced parallel rows transversely intersecting said first series of spacer elements and joined thereto, said spacer elements having integral spaced arches along their length; and a matrix of interconnected spring element strips formed of a second material having better stress relaxation properties than said first material, said matrix of interconnected spring element strips internested within said matrix of spacer elements and including a first series of spring element strips arranged in parallel rows interspaced between and parallel to said first series of spacer elements, a second series of spring element strips arranged in parallel rows interspaced between and parallel to said second series of spacer elements and transversely intersecting said first series of spring element strips, said first and second series of spring element strips having tab-like projections extending therefrom at selected locations adjacent the intersections of said first and second series of spring element strips, said tab-like projections having a biasing surface directed toward opposite intersections of said first and second series of spacer elements so as to bias fuel elements within said grid arrangement against said arches of said spacer elements forming said opposite intersections.

2. The arrangement of claim 1 wherein said first material is Zircaloy and said second material is an iron, chromium, nickel alloy.

3. The arrangement of claim 1 wherein said tab-like projections are stamped out of said spring element strips.

* * * * *